United States Patent
D'Aluisio et al.

(10) Patent No.: US 9,457,867 B2
(45) Date of Patent: Oct. 4, 2016

(54) BICYCLE BRAKE ASSEMBLY

(71) Applicant: Specialized Bicycle Components, Inc., Morgan Hill, CA (US)

(72) Inventors: Christopher P. D'Aluisio, Corralitos, CA (US); David Tyson Buckenberger, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 14/186,987

(22) Filed: Feb. 21, 2014

(65) Prior Publication Data

US 2014/0265221 A1    Sep. 18, 2014

Related U.S. Application Data

(60) Provisional application No. 61/782,642, filed on Mar. 14, 2013.

(51) Int. Cl.
| | | |
|---|---|---|
| *B62L 1/00* | (2006.01) | |
| *B62L 1/10* | (2006.01) | |
| *B62L 1/14* | (2006.01) | |
| *B62L 1/16* | (2006.01) | |
| *B62L 3/00* | (2006.01) | |
| *B62L 3/02* | (2006.01) | |
| *B62K 3/00* | (2006.01) | |

(52) U.S. Cl.
CPC . *B62L 1/14* (2013.01); *B62K 3/00* (2013.01); *B62L 1/005* (2013.01); *B62L 1/10* (2013.01); *B62L 1/16* (2013.01); *B62L 3/023* (2013.01)

(58) Field of Classification Search
CPC ............ B62L 1/005; B62L 1/02; B62L 1/04; B62L 1/06; B62L 1/10; B62L 1/14; B62L 1/16; B62L 3/00; B62L 3/02
See application file for complete search history.

(56) References Cited

U.S. PATENT DOCUMENTS

| 3,921,764 | A | * | 11/1975 | Mathauser | ................ | 188/24.14 |
| 4,036,333 | A | * | 7/1977 | Mathauser | ................ | 188/264 A |
| 4,546,858 | A | | 10/1985 | Nagano | | |
| 4,597,474 | A | | 7/1986 | Nagano | | |
| 4,669,581 | A | * | 6/1987 | Restelli | ................ | 188/24.12 |

(Continued)

FOREIGN PATENT DOCUMENTS

| CH | 272457 | * 12/1950 |
| CN | 201437391 U | 4/2010 |

(Continued)

*Primary Examiner* — Joseph Rocca
*Assistant Examiner* — Maurice Williams
(74) *Attorney, Agent, or Firm* — Knobbe Martens Olson & Bear LLP

(57) ABSTRACT

Various bicycle brake assemblies are described. In some embodiments, a bicycle brake assembly for applying a braking force to a wheel comprises a brake arm comprising a frame pivot joint and a brake pad pivot joint, the frame pivot joint configured to pivotally connect the brake arm to a bicycle frame to enable pivoting of the brake arm about a first axis of rotation; and a brake pad pivotally coupled to the brake arm at the brake pad pivot joint to enable pivoting of the brake pad about a second axis of rotation, the brake pad comprising a braking surface for engaging a wheel rim to apply a frictional force to the wheel rim, the frictional force having a frictional direction, wherein the first axis of rotation is not parallel to the frictional direction of the frictional force.

13 Claims, 6 Drawing Sheets

(56) References Cited

U.S. PATENT DOCUMENTS

| | | | |
|---|---|---|---|
| 4,768,623 A | 9/1988 | Nagano | |
| 4,896,750 A | 1/1990 | Tseng | |
| 5,064,027 A * | 11/1991 | Akamatsu | B62L 1/005 188/24.12 |
| 5,099,958 A | 3/1992 | D'Aluisio | |
| 5,168,962 A * | 12/1992 | Yoshigai | 188/24.19 |
| 5,431,257 A * | 7/1995 | Rocca | B60T 1/12 188/24.19 |
| 5,636,716 A | 6/1997 | Sugimoto et al. | |
| 5,655,630 A | 8/1997 | Sugimoto | |
| 5,803,207 A | 9/1998 | Nielsen | |
| 5,960,913 A | 10/1999 | Kuo | |
| 6,032,766 A | 3/2000 | Yang | |
| 6,089,356 A | 7/2000 | Ohta et al. | |
| 6,099,440 A * | 8/2000 | Schurter et al. | 482/63 |
| 6,186,529 B1 | 2/2001 | Fujii | |
| 6,220,399 B1 * | 4/2001 | Phillips et al. | 188/24.21 |
| 6,607,057 B2 | 8/2003 | Lumpkin et al. | |
| 6,615,955 B2 * | 9/2003 | Jakovljevic | B60T 1/04 188/24.14 |
| 7,000,936 B2 * | 2/2006 | Schmider | B62K 21/00 280/281.1 |
| 7,775,331 B1 | 8/2010 | Felt et al. | |
| 7,891,687 B2 * | 2/2011 | Schmider | B62K 19/30 280/281.1 |
| 7,946,395 B1 | 5/2011 | Tsai | |
| 7,946,605 B2 | 5/2011 | Lane | |
| 8,066,104 B2 | 11/2011 | D'Aluisio | |
| 8,079,609 B2 | 12/2011 | Bell et al. | |
| 8,096,391 B2 | 1/2012 | White et al. | |
| 8,356,828 B2 | 1/2013 | Bell et al. | |
| 2001/0045330 A1 * | 11/2001 | Chiang et al. | 188/24.12 |
| 2004/0188976 A1 * | 9/2004 | Schmider | B62K 21/00 280/279 |
| 2006/0145446 A1 * | 7/2006 | Schmider | 280/281.1 |
| 2006/0185939 A1 * | 8/2006 | Tsai | B60T 11/046 188/24.12 |
| 2007/0068744 A1 | 3/2007 | Tsai | |
| 2007/0251768 A1 * | 11/2007 | Sandro et al. | 188/24.12 |
| 2007/0251780 A1 | 11/2007 | Lyons | |
| 2009/0057071 A1 * | 3/2009 | Kimori | 188/24.19 |
| 2010/0253038 A1 * | 10/2010 | Soucek | B62K 19/02 280/274 |
| 2011/0275488 A1 * | 11/2011 | Hamilton | A63B 24/0087 482/61 |
| 2013/0026732 A1 | 1/2013 | Kohl et al. | |
| 2013/0187358 A1 | 7/2013 | Kohl et al. | |

FOREIGN PATENT DOCUMENTS

| | | | |
|---|---|---|---|
| DE | 1505924 | * | 1/1972 |
| DE | 102005016386 A1 * | | 10/2006 |
| FR | 541964 | * | 8/1922 |
| FR | 805633 | * | 11/1936 |
| WO | WO 2007/031967 A2 | | 3/2007 |

* cited by examiner

BICYCLE BRAKE ASSEMBLY

CROSS-REFERENCE TO RELATED APPLICATIONS

This application claims the benefit of U.S. Provisional Application No. 61/782,642, titled HYDRAULIC RIM BRAKE, filed on Mar. 14, 2013, which is hereby incorporated by reference herein in its entirety.

BACKGROUND

1. Field

This application relates to brake assemblies, and more particularly to bicycle brake assemblies.

2. Description of the Related Art

Various types of brakes for bicycles have been used. However, known units such as existing cantilever brakes and U-brakes have various limitations and disadvantages.

SUMMARY

Example embodiments described herein have several features, no single one of which is indispensable or solely responsible for their desirable attributes. Without limiting the scope of the claims, some of the advantageous features will now be summarized.

In some embodiments, a bicycle brake assembly for applying a braking force to a wheel comprises a brake arm comprising a frame pivot joint and a brake pad pivot joint, the frame pivot joint configured to pivotally connect the brake arm to a bicycle frame to enable pivoting of the brake arm about a first axis of rotation; and a brake pad pivotally coupled to the brake arm at the brake pad pivot joint to enable pivoting of the brake pad about a second axis of rotation, the brake pad comprising a braking surface for engaging a wheel rim to apply a frictional force to the wheel rim, the frictional force having a frictional direction, wherein the first axis of rotation is not parallel to the frictional direction of the frictional force.

In some embodiments, a bicycle brake assembly for applying a braking force to a wheel comprises a brake arm comprising a frame pivot joint and a brake pad pivot joint, the frame pivot joint configured to pivotally connect the brake arm to a bicycle frame to enable pivoting of the brake arm about a first axis of rotation; and a brake pad pivotally coupled to the brake arm at the brake pad pivot joint to enable pivoting of the brake pad about a second axis of rotation, the brake pad comprising a braking surface for engaging a wheel rim, the braking surface comprising a trailing edge and a leading edge, the brake pad comprising a first thickness at the trailing edge and a second thickness at the leading edge, wherein the first thickness is greater than the second thickness.

In some embodiments, an aerodynamic bicycle brake system for applying a braking force to a wheel comprises a bicycle frame having a seat tube; a rear brake arm pivotally coupled to the seat tube; and a rear brake pad coupled to the rear brake arm, the rear brake pad comprising a rear braking surface positioned to engage a rear wheel rim when the rear brake arm pivots in a direction toward the rear wheel rim, wherein the seat tube comprises an integral air deflector positioned adjacent the rear brake arm, the air deflector shaped to reduce an aerodynamic footprint of the rear brake arm.

The disclosure also includes methods of using and methods of manufacture of the systems and/or various components or combinations of components described above or elsewhere herein.

BRIEF DESCRIPTION OF THE DRAWINGS

These and other features, aspects and advantages of the inventions will be better understood with reference to embodiments illustrated in the accompanying drawings. The illustrated embodiments are not intended to define the limits or scope of the inventions.

DETAILED DESCRIPTION

Figure 1:
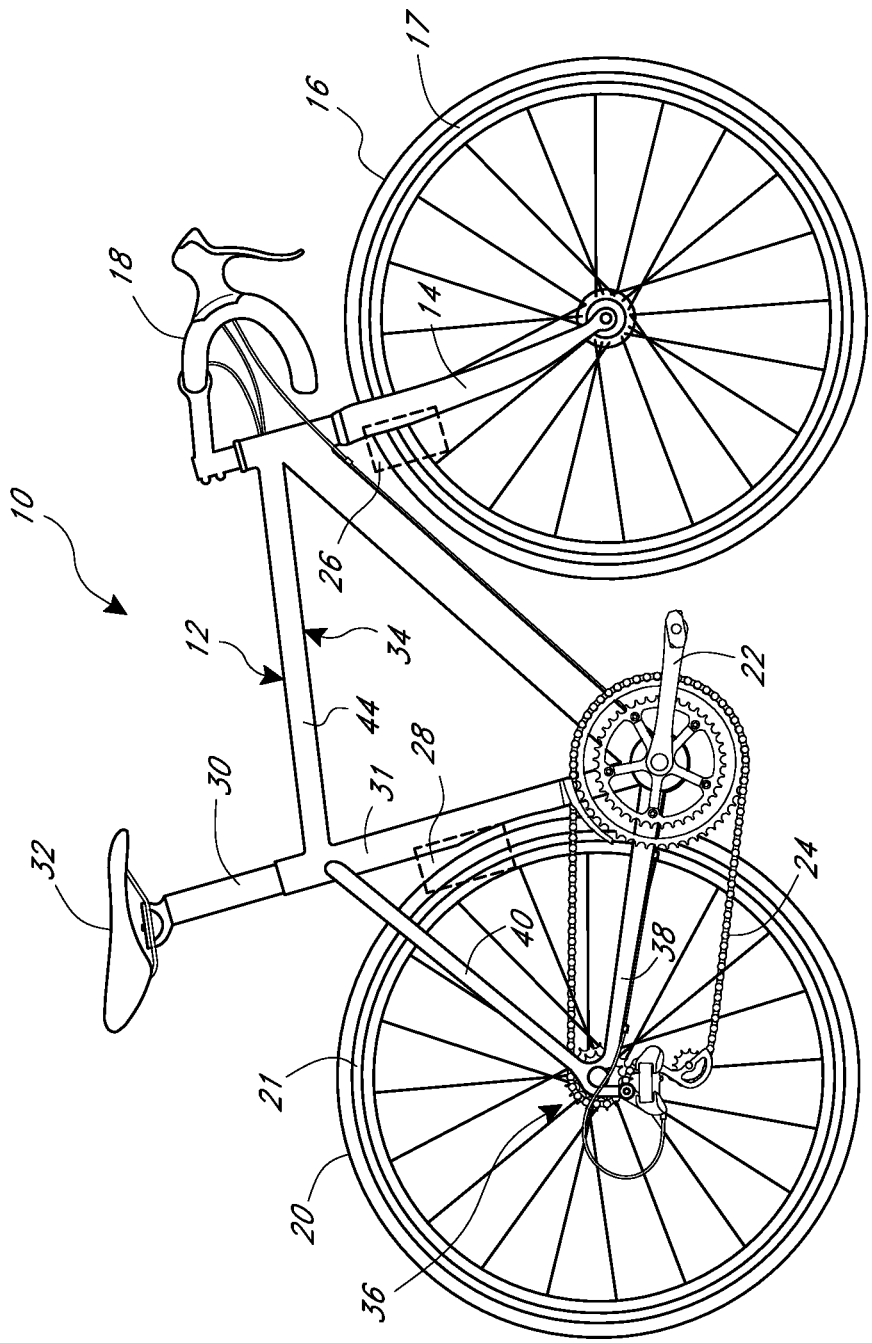
FIG. 1 is a side view of a bicycle incorporating aerodynamic rim brake assemblies.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Bicycle rim brakes operate by locating brake pads comprising friction material on either side of a bicycle wheel rim and compressing the brake pad assemblies against the rim to generate frictional force. Increasing levels of frictional force can be generated to slow and eventually stop the bicycle. Rim brakes come in various forms, such as U-brakes, V-brakes, and various other designs.

One disadvantage of commonly used bicycle rim brakes is that their configuration and placement introduce aerodynamic drag while a rider is riding a bicycle. Disclosed herein are embodiments of aerodynamic bicycle rim brakes configured to optimize an aerodynamic profile of a bicycle. In some embodiments, a front rim brake is positioned out of an airflow path by positioning it completely or partially behind a front fork of a bicycle, keeping the fork overall width at a minimum with a clean leading edge. In some embodiments, a rear rim brake is positioned behind a water bottle and attached to a seat tube. By positioning rim brakes behind a bicycle fork and/or behind a bicycle seat tube, aerodynamic drag can be reduced.

Commonly used rim brakes can be relatively simple to design and relatively cheap to manufacture. In an example of a traditional rim brake, a brake caliper is configured to rotate brake arms having brake pads connected at distal ends of the arms. The brake arms are configured to rotate about an axis of rotation that is parallel to a longitudinal axis of the brake pads. While such a design is relatively simple, one inventive aspect is the recognition that constraining the longitudinal axis of a brake pad to be parallel to the axis of rotation of the brake arms introduces limitations that can limit the ability to design a more aerodynamic rim brake. As is discussed in further detail below with reference to FIGS. 2A-2C and 3A-3B, various embodiments of rim brake designs that are more aerodynamic and/or integrated into a bicycle frame are provided. These aerodynamic rim brake designs incorporate, among other things, innovative features enabling a rim brake to comprise a brake arm that pivots about an axis of rotation not parallel to a longitudinal axis of a brake pad.

FIG. 1 illustrates a bicycle 10 that can be used with aerodynamic rim brakes. The bicycle 10 includes a frame 12, which rotatably supports a wheel support, or front fork assembly 14, near a forward end of the frame 12 for rotation about a steering axis. A lower end of the fork assembly 14 supports a front wheel 16 of the bicycle 10. A handlebar assembly 18 is connected to an upper end of the fork 14 for rotating the fork assembly 14 and front wheel 16 about the steering axis of the bicycle 10. In addition, the handlebar assembly 18 may include one or more rider controls, such as shifting or braking controls.

A rear wheel 20 of the bicycle 10 is supported near a rearward end of the frame 12. A pedal crank assembly 22 is rotatably supported by a lower portion of the frame 12. A drive chain 24 extends between the pedal crank assembly and the rear wheel to transfer power therebetween, as is well known in the art.

A front aerodynamic rim brake assembly can be positioned and supported by the front fork assembly 14 at, for example, the area indicated by box 26. The front rim brake assembly can be configured to selectively apply a squeezing force to a rim 17 of the front wheel 16. The front rim brake assembly can in some embodiments be, for example, the front rim brake assembly 226 described below with reference to FIGS. 2A-2C. Similarly, a rear aerodynamic rim brake assembly can be supported by a seat tube 31 of the frame 12 at, for example, the area indicated by box 28. The rear rim brake assembly can be configured to selectively apply a squeezing force to a rim 21 of the rear wheel 20. The rear rim brake assembly can in some embodiments be, for example, the rear rim brake assembly 228 described below with reference to FIGS. 3A-3B.

A seat post 30 extends in an upward direction from the seat tube 31 of the frame 12 and supports a seat 32 on its upper end. The seat post 30 may be adjusted in height relative to the frame 12 to adjust a seat height of the bicycle 10.

In some embodiments, the frame 12 includes a main frame portion 34 and a wheel support, or rear frame portion 36. The embodiment illustrated in FIG. 1 is a road bike wherein the main frame portion 34 and rear frame portion 36 are generally rigidly connected. However, in some embodiments, such as in mountain bike embodiments, the rear from portion 36 can be pivotally connected to the frame 12 and equipped with shock absorbers. The rear frame portion 36 desirably includes a pair of lower legs, or chain stay members 38 (only one shown), extending on each side of the rear wheel 20 from a lower portion of the main frame 34. In addition, the rear frame portion 36 includes a pair of upper legs, or seat stay members 40, extending from an upper portion of the main frame 34 on each side of the rear wheel 20 and being connected to a rear end of the chain stays 38 near a hub axis of the rear wheel 20.

Desirably, at least the main frame 34 is constructed from a plurality of tubular, metal pieces welded together. For example, the main frame 34 may be constructed from aluminum, steel or titanium tubing. Alternatively, the frame may comprise a composite material and may be constructed as a unitary piece. In addition, other suitable materials and/or construction methods may also be used, as will be appreciated by one of skill in the art.

Figure 2A:
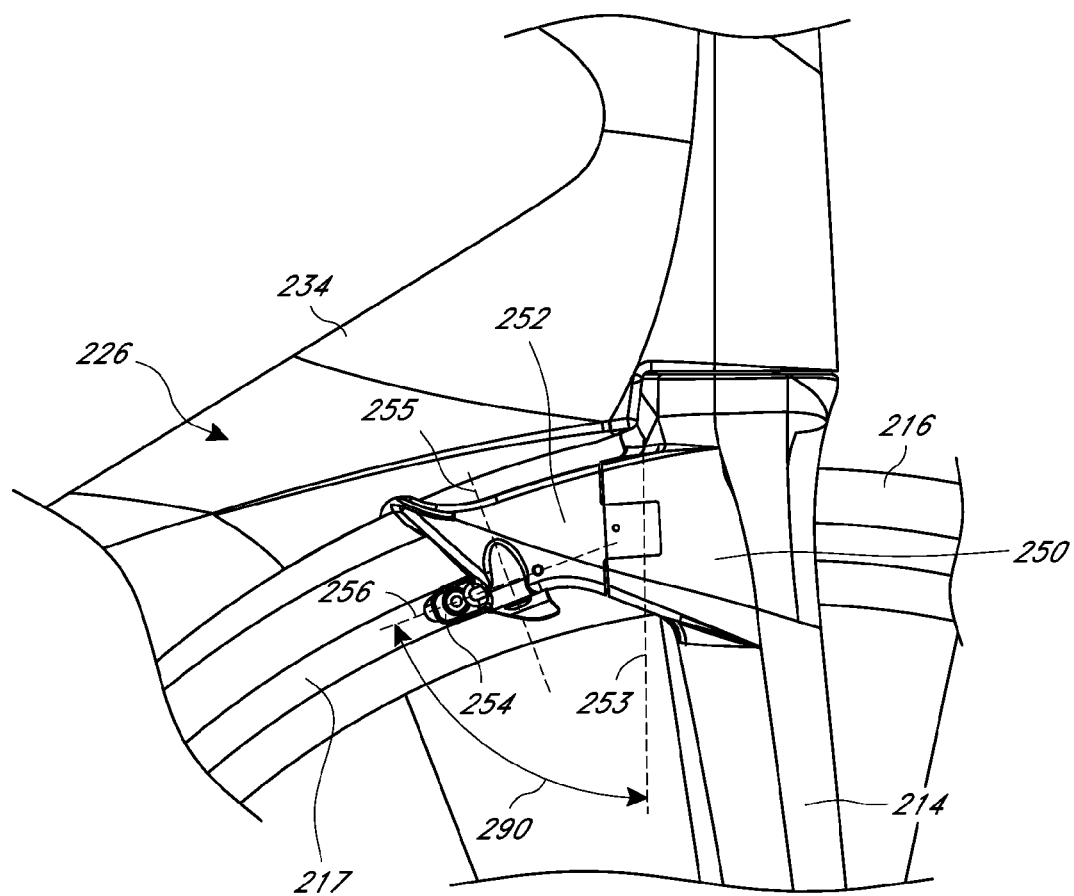
FIG. 2A is a side view of an embodiment of a front brake assembly connected to a bicycle.
Figure 2B:
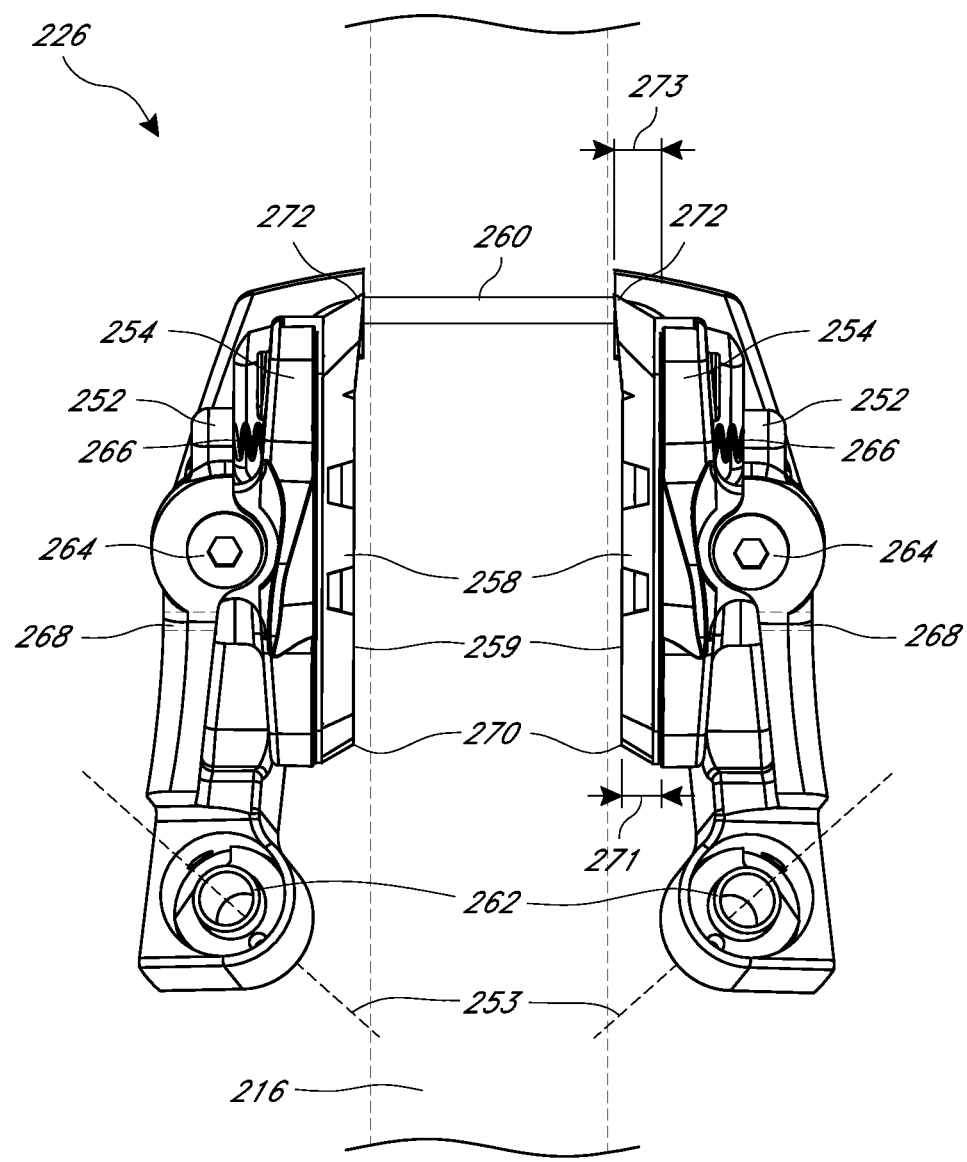
FIG. 2B is a bottom view the front brake assembly of FIG. 2A.
Figure 2C:
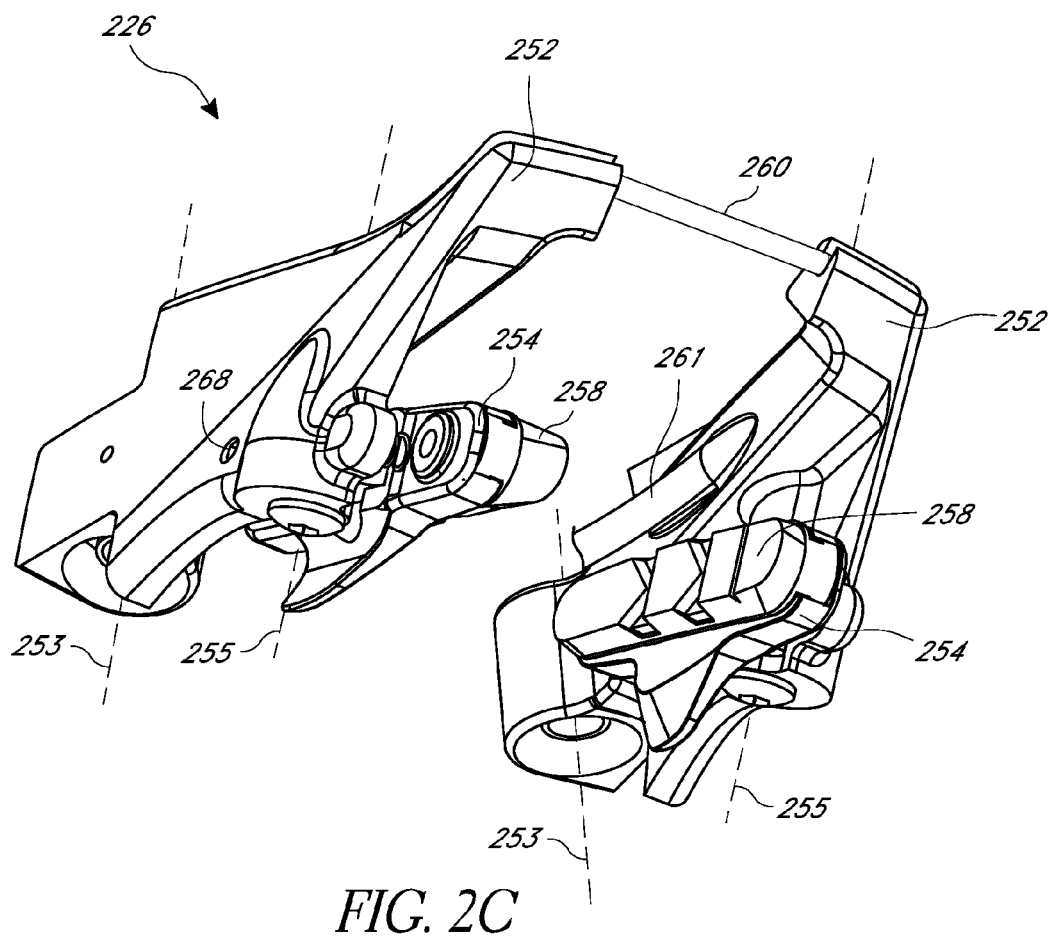
FIG. 2C is a perspective view of the front brake assembly of FIG. 2A.

FIGS. 2A-2C illustrate an embodiment of a front brake assembly 226. The front brake assembly 226 is an aerodynamic brake assembly that can be positioned, for example behind or integrated into a fork 214 at the area illustrated by box 26 of FIG. 1 FIG. 2A is a side view of the front brake assembly 226. FIG. 2B is a bottom view of the front brake assembly 226, the view oriented along a plane generally perpendicular to an axis of rotation 255 of a brake shoe. FIG. 2C is a perspective view of the front brake assembly 226.

The front brake assembly 226 comprises two opposing arms 252 pivotally connected to the front fork assembly 214. The arms 252 are each configured to pivot or rotate about an axis of rotation 253 at a pivot joint 262. In some embodiments, an air deflector 250 is incorporated into the front fork assembly 214 in front of the arms 252 to make the assembly more aerodynamic. In other embodiments, an air deflector is not included.

The front rim brake assembly 226 further comprises two brake shoes 254 pivotally coupled to the arms 252. The brake shoes 254 are each configured to pivot or rotate about an axis of rotation 255 with respect to the arm 252. The brake shoes 254 further comprise brake pads 258 comprising a braking surface 259 configured to engage a rim 217 of the wheel 216 when the arms 252 are pivoted or rotated inward to compress the braking surfaces 259 against the rim 217 of the wheel 216. In some embodiments, a pull cable 260 extends between the two brake arms 252 at a distal end. The pull cable 260 can be operated by, for example, hand controls located at a handlebar of the bicycle, such as the handlebar assembly 18 illustrated in FIG. 1. When the pull cable 260 is operated, it pulls the arms 252 toward one another to compress the braking surfaces 259 against the rim 217 of the wheel 216.

To enable positioning the front rim brake assembly 226 in an aerodynamically optimum location, the brake arms 252 are configured to pivot or rotate about an axis that is not parallel to a longitudinal axis 256 of the brake pads 258. By rotating the arms 252 about the axis 253 that is not parallel to the longitudinal axis 256 of the brake pads 258, a complication is introduced into the design, because a trailing edge 272 of the braking surface 259 will travel further than a leading edge 270 of the braking surface 259. If the brake shoes 254 were rigidly attached to the arms 252, the braking surface 259 would not evenly engage the rim 217 of the wheel 216. More pressure would be produced at the trailing edge end of the brake pad than at the leading edge end of the brake pad. This would lead to uneven wear of the brake pad 258 and non-optimal braking performance.

To address this complication, embodiments disclosed herein provide a pivoting brake pad 258 to enable more even distribution of pressure along the braking surface 259. In some embodiments, as the brake arms 252 are rotated toward the wheel 216, the trailing edge 272 is the first portion of the braking surface 259 to contact the rim. However, as the brake arms 252 continue to rotate toward one another, the brake shoes 254 pivot about the pivot joints 264 to enable full engagement of the braking surfaces 259 against the rim 217 of the wheel 216.

In some embodiments, a brake pad comprises a length, width, and height, the length being greater than the width and height, and a longitudinal axis extending in the direction of the length. In some embodiments, the longitudinal axis corresponds to a line which is substantially parallel to or parallel to a tangent of a wheel rim at or near a point of contact between the rim and the brake pad. In some embodiments, a brake pad comprises a longitudinal axis that corresponds to a line that is substantially parallel to or parallel to or in line (coincident with) with a direction of frictional force applied by the brake pad to the wheel rim. For example, as can be seen in FIG. 2A, the longitudinal axis 256 of the brake pad is generally in line with the direction of frictional force that will be applied by the brake pad to the rim 217 of the wheel 216 when the brake pads are compressed against the rim 217 of the wheel 216. In some embodiments, however, the longitudinal axis of the brake pad may not necessarily be in line with the tangent of the wheel rim and/or the direction of frictional force. In those embodiments, the brake arm can be configured to rotate about an axis that is not parallel to the longitudinal axis of the brake pad and/or that is not parallel to the tangent of the wheel rim and/or the direction of frictional force. Further, in some embodiments, a brake pad may comprise a shape, such as a circle, that may not necessarily have an easily-defined longitudinal axis. In those embodiments, the brake arm can still be configured to rotate about an axis that is not parallel to the tangent of the wheel rim and/or the direction of frictional force.

It should be understood by one of skill in the art that the concepts disclosed herein relating to a longitudinal axis of a brake pad can also or alternatively be applied as relating to the tangent of the wheel rim and/or the direction of frictional force. For example, when a brake arm axis of rotation is described herein as being not parallel to or at a specified angle in relation to a brake pad longitudinal axis, an alternate embodiment can define the brake arm axis of rotation as being not parallel to or at the specified angle in relation to the tangent of the wheel rim and/or the direction of frictional force.

The bicycle 10 illustrated in FIG. 1 comprises a length, width, and height. The direction of the length is from the front to back of the bicycle, such as from the front wheel 16 to the rear wheel 20. The direction of the height is from the bottom to the top, such as from the bottom of the wheels to the top of the seat 32. The width is in a direction perpendicular to the orientation of the view shown in FIG. 1. As can be seen in FIG. 2B, the brake pads 258 also comprise a width 273 at the trailing edge 272 and a width 271 at the leading edge 270. The width 273 and width 271 are generally in the same direction as the width of the bicycle 10. In this embodiment, the width 273 at the trailing edge is larger or wider than the width 271 at the leading edge 270. One advantage of such a design is that when the bicycle is traveling in a forward direction, the rim 217 of the wheel 216 will be passing from the leading edge 270 to the trailing edge 272. If the rim 217 of the wheel 216 were to contact a leading portion of the brake pad before a trailing portion, a vibration or chatter could result. However, by contacting the trailing edge first, a smoother engagement can occur.

To further enable a smooth engagement of the brake pads 258, the front rim brake assembly 226 further comprises springs 266 positioned between the brake arms 252 and brake shoes 254 to bias the trailing edge 272 toward the wheel 216 when the front rim brake assembly 226 is in a relaxed position wherein the braking surfaces 259 are not in contact with the rim 217 of the wheel 216. Further, an adjustable stop 268, as can be seen in FIGS. 2B and 2C, enables a user to adjust a home location of the brake shoes 254 when the spring 266 biases the brake shoes 254 against the adjustable stop 268 in the relaxed position. In this embodiment, the adjustable stops 268 comprise threaded screws, such as, for example, a set screw, that engages a thread of the brake arms 252 and a back surface of the brake shoe 254. This enables a user to screw the adjustable stops 268 inwardly or outwardly to set the position of the brake shoes 254 in the relaxed home position. In other embodiments, other biasing and stop features may be utilized. For example, rotational or torsion springs may be used. Further, other stop features may be utilized, such as non-adjustable stops and/or rotational stops.

In the embodiment illustrated in FIG. 2B, the braking surfaces 259 are not completely flat near the trailing edge 272. However, the brake pad 258 can be made out of or can comprise a flexible material that enables the trailing edge portion to flex when pressure is applied to the rim 217 of the wheel 216 to enable the braking surface 259 to become totally flat or substantially flat when the braking surface 259 is applying pressure to the rim 217 of the wheel 216.

In various embodiments, the axis of rotation 253 of the brake arms 252 can be located in various orientations relative to the longitudinal axis 256 of the brake pads 258. In this embodiment, the angle 290 is approximately 70°. In other embodiments, the axis 253 may be oriented at 90° to the longitudinal axis 256. In other embodiments, the axis of rotation 253 may be oriented at an angle greater than 90° or less than 90°, such as 85°, 80°, 75°, 70°, etc., or even lower, such as 45° or 10°. In this embodiment, the axis of rotation 255 of the brake shoe 254 is oriented at 90° to the longitudinal axis 256 of the brake pad 258. In other embodiments, this angle may be smaller than 90°.

In some embodiments, the front brake assembly 226 comprises a pull cable 260 that is configured to pass through one of the brake arms 252 and through a shroud 261 that is configured to extend from an opening in the front fork 214. Such a design can further enable optimum aerodynamics by not exposing the pull cable 260 or shroud 261 to the airflow path around the bicycle.

Figure 3A:
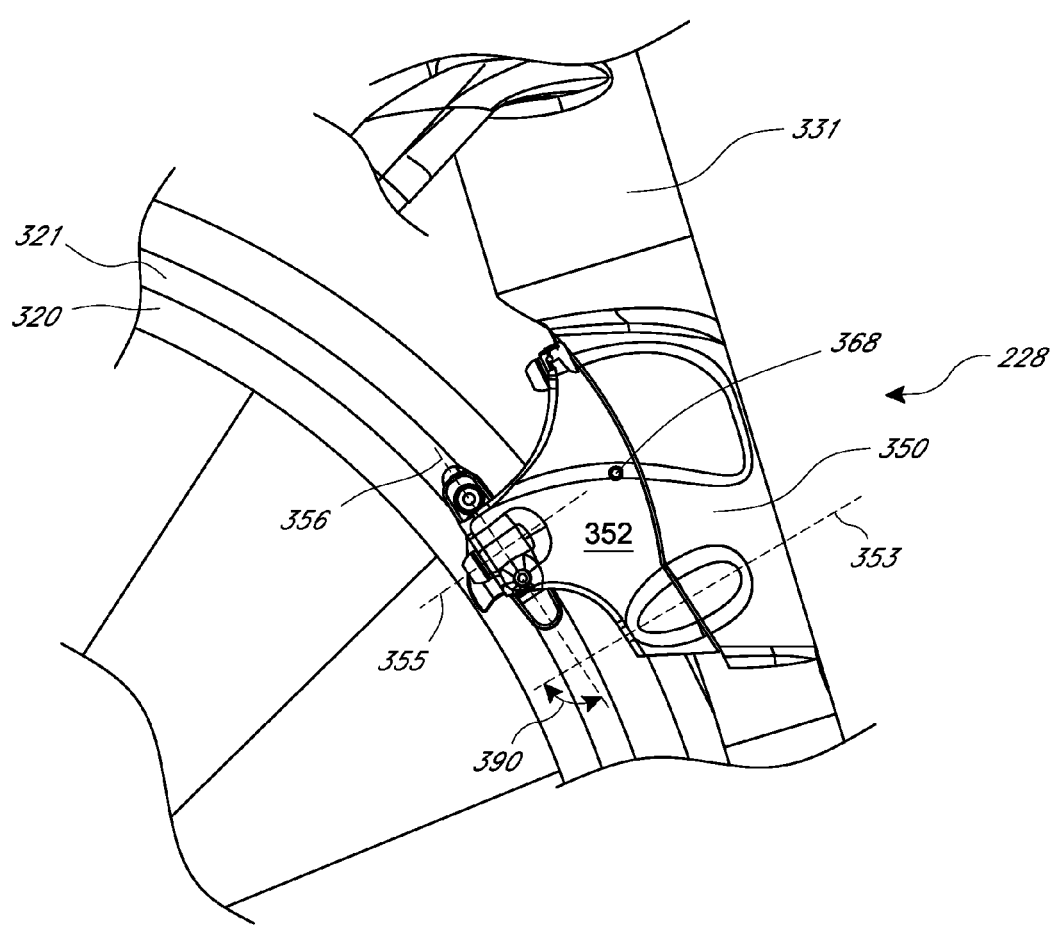
FIG. 3A is a side view of an embodiment of a rear brake assembly connected to a bicycle.
Figure 3B:
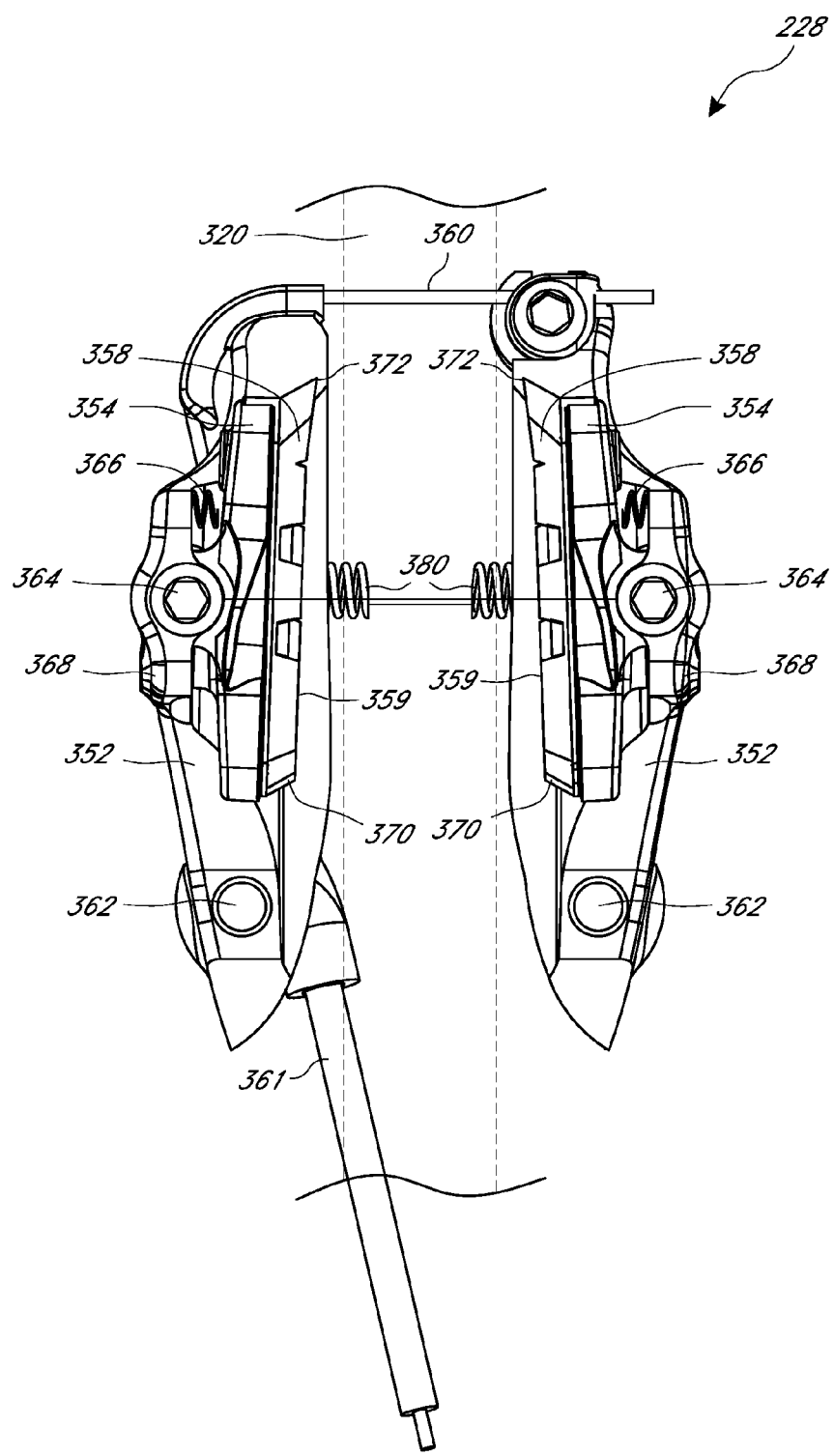
FIG. 3B is a back view the rear brake assembly of FIG. 3A.

FIGS. 3A and 3B illustrate another embodiment of an aerodynamic rim brake assembly 228. In this embodiment, the aerodynamic rim brake assembly is a rear rim brake assembly 228. The rear brake assembly 228 operates similarly to the embodiment of a brake assembly illustrated in FIGS. 2A-2C. The various elements of the rear brake assembly 228 illustrated in FIGS. 3A-3B utilize like reference numerals to refer to like components. For example, the rear brake assembly 228 comprises brake pads 358 similar in design to the brake pads 258 of the front brake assembly 226. The rear rim brake assembly 228 further comprises brake shoes 354 similar in design to the brake shoes 254 of the front brake assembly.

One difference in the design of the rear rim brake assembly 228 is that the rear brake arms 352 are configured to pivot along an axis of rotation 353 at a pivot joint 362 that connects the arms 352 to a seat tube 331 instead of the front fork assembly 214. However, similarly to the front rim brake assembly, the axis of rotation 353 in this embodiment is positioned at an angle 390 not parallel to the longitudinal axis 356 of the rear brake pads 358. In this embodiment, the angle 390 is approximately a 93°. However, as with the angle 290, this angle may vary in other embodiments.

A pull cable 360 passes through the seat tube 331, around a distal end of one of the brake arms 352, and to a distal end of the other brake arm 352. As with the front brake assembly, the pull cable 360 can be configured to pass into the frame of the bicycle to reduce or eliminate its aerodynamic footprint. When the pull cable 360 is operated, for example by a hand lever, the pull cable 360 operates to pull the brake arms 352 toward one another by pivoting them around their axes of rotation 353 at their pivot joints 362. As the brake arms 352 move toward the rim 321 of the wheel 320, first the trailing edges 372 of the brake pads 358 contact the rim 321 of the wheel 320. Then, as the brake arms 352 are further moved toward the wheel 320, the brake shoes 354 pivot against the force of the springs 366 and about the axis 355 at the pivot joint 364. When the brake arms 352 are in an intermediate position, a portion of the brake pads 358 comprising the trailing edge 372 is in contact with the rim 321 of the wheel 320, but a portion of the brake pads 358 comprising the leading edges 370 is not in contact with the rim 321 of the wheel 320. When the brake arms 352 are further rotated, the rest of the braking surface 359 of the brake pads 358 comes into contact with the rim 321 of the wheel 320. The arms 352 are then in a braking position with friction being generated between the braking surfaces 359 and the rim 321 of the wheel 320 to facilitate slowing or stopping of the bicycle. A brake arm spring 380 engages the brake arms 352 and the seat tube 31, and biases the brake arms 352 to pivot away from the rear wheel 320 when the pull cable 360 is released. One of ordinary skill in the art will recognize that the brake arm spring 380 can also be utilized to pivot the front brake arms 252 away from the front wheel 216.

Reference throughout this specification to "some embodiments" or "an embodiment" means that a particular feature, structure, or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures, or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although described in the illustrative context of certain preferred embodiments and examples, it will be understood by those skilled in the art that the disclosure extends beyond the specifically described embodiments to other alternative embodiments and/or uses and obvious modifications and equivalents. For example, the brake arms can be configured to pivot at different angles relative to the wheel than as shown in the embodiments disclosed herein. The brake assembly could also be actuated with a mechanism other than a pull cable.

What is claimed is:

1. An aerodynamic bicycle brake system for applying a braking force to a wheel, the aerodynamic bicycle brake system comprising:
   a bicycle frame having a seat tube including upper and lower ends, at least one seat stay connected to the seat tube adjacent the seat tube upper end and at least one chainstay connected to the seat tube adjacent the seat tube lower end;
   a rear brake arm pivotally coupled to the seat tube intermediate the seat tube upper and lower ends; and
   a rear brake pad coupled to the rear brake arm, the rear brake pad comprising a rear braking surface positioned to engage a rear wheel rim when the rear brake arm pivots in a direction toward the rear wheel rim,
   wherein the seat tube comprises an integral air deflector positioned adjacent the rear brake arm, the air deflector shaped to reduce an aerodynamic footprint of the rear brake arm.

2. The aerodynamic brake system of claim 1, further comprising:
   a front brake arm pivotally coupled to a steering fork of the bicycle frame; and
   a front brake pad coupled to the front brake arm, the front brake pad comprising a front braking surface positioned to engage a front wheel rim when the front brake arm pivots in a direction toward the front wheel rim,
   wherein the steering fork comprises a second integral air deflector that projects beyond a rear wall of the steering fork and is positioned adjacent the front brake arm, the second integral air deflector shaped to reduce an aerodynamic footprint of the front brake arm.

3. The aerodynamic brake system of claim 1, wherein the rear braking surface is configured to apply a frictional force to the rear wheel rim, the frictional force having a frictional direction, and wherein the rear brake arm is pivotally coupled to the seat tube to enable the rear brake arm to pivot about a first axis of rotation, the first axis of rotation not parallel to the frictional direction of the frictional force.

4. The bicycle brake assembly of claim 3, wherein the first axis of rotation is oriented with respect to the frictional direction of the frictional force at an angle of at least 45 degrees.

5. The aerodynamic brake system of claim 1, wherein the rear braking surface comprises a trailing edge and a leading edge, the rear brake pad comprising a first thickness at the trailing edge and a second thickness at the leading edge, wherein the first thickness is greater than the second thickness.

6. The aerodynamic brake system of claim 1, wherein the brake system is positioned behind a water bottle.

7. The aerodynamic brake system of claim 1, wherein the integral air deflector projects laterally outward from adjacent portions of the seat tube.

8. The aerodynamic brake system of claim 1, wherein the rear brake arm is pivotally coupled to the seat tube above a connection between a down tube and the seat tube and above a connection between a pair of chainstays and the seat tube.

9. A bicycle brake assembly for applying a braking force to a wheel, the bicycle brake assembly comprising:
- a first and a second brake arm[s], each comprising proximal and distal ends and a frame pivot joint, the frame pivot joint configured to pivotally connect the brake arm to a bicycle frame to enable pivoting of the brake arm; and
- a first and a second brake pad, each comprising a leading edge and a trailing edge and a braking surface for engaging a wheel rim to apply a frictional force to the wheel rim;
- wherein the first brake pad and the first brake arm are oriented generally parallel to one another;
- wherein the second brake pad and the second brake arm are oriented generally parallel to one another;
- wherein the first brake pad is coupled to the first brake arm intermediate the first brake arm proximal and distal ends, and the first brake arm distal end projects beyond the first brake pad trailing end; and
- wherein the second brake pad is coupled to the second brake arm intermediate the second brake arm proximal and distal ends, and the second brake arm distal end projects beyond the second brake pad trailing end.

10. The bicycle brake assembly of claim 9, wherein the frame pivot joint is disposed at the proximal end of each of the first and the second brake arm[s], and a pull cable engages the distal end of each of the first and the second brake arms.

11. The bicycle brake assembly of claim 10, wherein the pull cable is configured to pull at least one of the first and the second brake arms in a direction toward the wheel rim, overcoming a force applied by a brake arm spring.

12. An aerodynamic bicycle brake system for applying a braking force to a wheel, the aerodynamic bicycle brake system comprising:
- a bicycle frame having a seat tube including upper and lower ends, at least one seat stay connected to the seat tube adjacent the seat tube upper end and at least one chainstay connected to the seat tube adjacent the seat tube lower end;
- a pair of rear brake arms each including proximal and distal ends and pivotally coupled to the seat tube intermediate the seat tube upper and lower ends;
- wherein the seat tube receives a first pull cable such that the first pull cable exits the seat tube adjacent one of the rear brake arms and wherein the rear brake arms are configured such that said one of the rear brake arms receives the first pull cable within an exterior structure of said one of the rear brake arms at the proximal end and the first pull cable exits said one of the rear brake arms at the distal end;
- a pair of front brake arms each including proximal and distal ends and pivotally coupled to a rear wall of a steering fork of the bicycle frame;
- wherein the steering fork receives a second pull cable such that the second pull cable exits the steering fork adjacent one of the pair of front brake arms and wherein the pair of front brake arms are configured such that said one of the pair of front brake arms receives the second pull cable within an exterior structure of said one of the pair of front brake arms at the proximal end and the second pull cable exits said one of the pair of front brake arms at the distal end such that the second pull cable is not exposed to an airflow path until the distal end of said one of the pair of front brake arms.

13. An aerodynamic bicycle brake system for applying a braking force to a wheel, the aerodynamic bicycle brake system comprising:
- a bicycle frame having a seat tube including upper and lower ends, at least one seat stay connected to the seat tube adjacent the seat tube upper end and at least one chainstay connected to the seat tube adjacent the seat tube lower end;
- a pair of rear brake arms each including proximal and distal ends and pivotally coupled to the seat tube intermediate the seat tube upper and lower ends;
- wherein the seat tube receives a first pull cable such that the first pull cable exits the seat tube adjacent one of the rear brake arms and is received within said one of the rear brake arms;
- wherein a first shroud receives the first pull cable, and said one of the pair of rear brake arms defines a longitudinal bore within an exterior structure of said one of the pair of rear brake arms such that the first pull cable and first shroud enter the proximal end of said one of the pair of rear brake arms, and the first pull cable exits the distal end of said one of the pair of rear brake arms;
- wherein the brake assembly further includes a pair of front brake arms each including proximal and distal ends and pivotally coupled to a rear wall of a steering fork of the bicycle frame;
- wherein the steering fork receives a second pull cable such that the second pull cable exits the steering fork adjacent one of the pair of front brake arms and is received within said one of the pair of front brake arms; and
- wherein a second shroud receives the second pull cable, and said one of the pair of front brake arms defines a longitudinal bore within an exterior structure of said one of the pair of front brake arms such that the second pull cable and second shroud enter the proximal end of said one of the pair of front brake arms, and the second pull cable exits the distal end of said one of the pair of front brake arms such that neither the second shroud or the second pull cable are exposed to an airflow path until the distal end of said one of the pair of front brake arms.

* * * * *